June 20, 1961
A. A. VARELA
2,989,743
RADAR PULSE STRETCHER
Filed Aug. 26, 1955
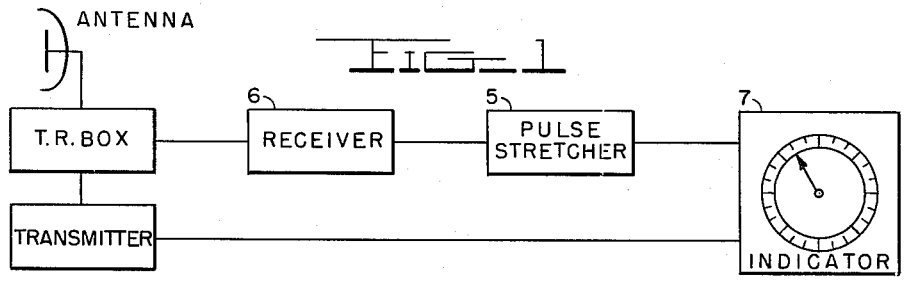
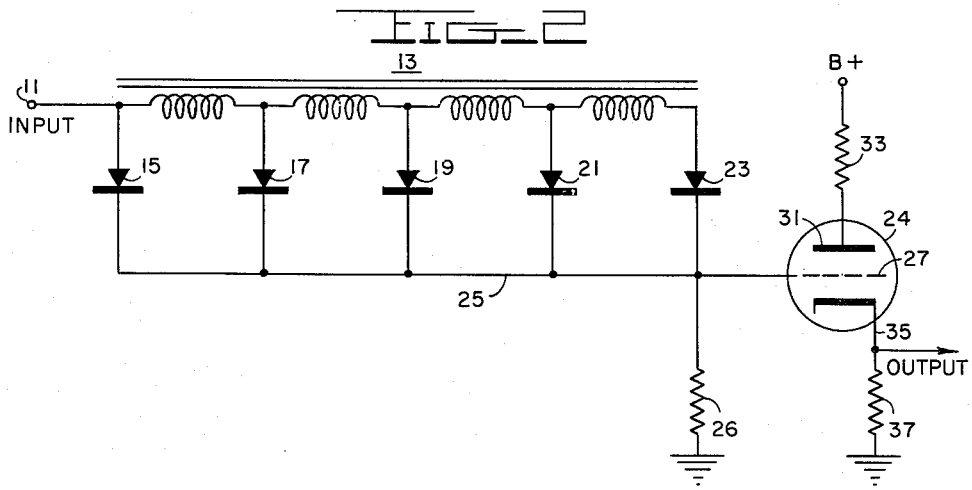
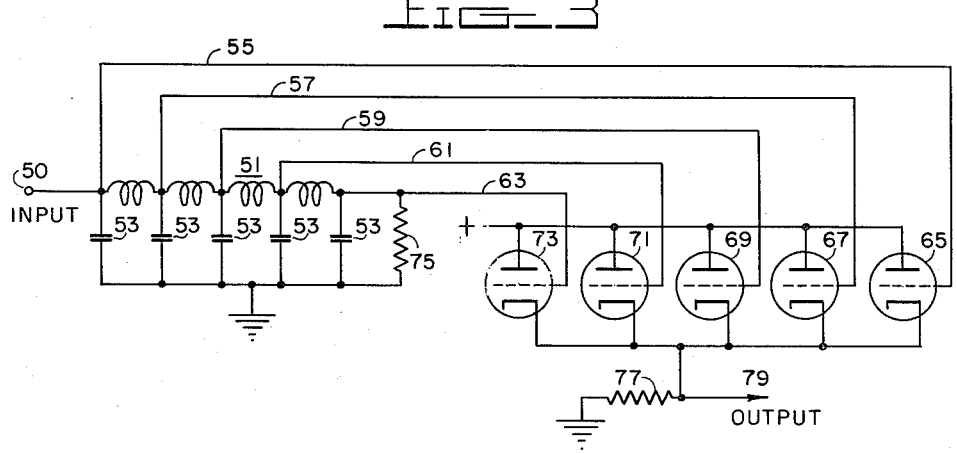
INVENTOR
ARTHUR A. VARELA.
BY
*Howard White* ATTORNEYS United States Patent Office 2,989,743
Patented June 20, 1961

2,989,743
RADAR PULSE STRETCHER
Arthur A. Varela, Alexandria, Va., assignor to the United States of America as represented by the Secretary of the Navy
Filed Aug. 26, 1955, Ser. No. 530,919
3 Claims. (Cl. 343—17.1)
(Granted under Title 35, U.S. Code (1952), sec. 266)

The invention described herein may be manufactured and used by or for the Government of the United States of America for governmental purposes without the payment of any royalties thereon or therefor.

This invention relates to a means for increasing the time duration of a pulse of electrical energy and more particularly to apparatus for non-linearly increasing the width of an electrical voltage pulse.

In long range radar system where the time of sweep is long, the number of target echoes and noise voltages is great compared to pulse widths, and more signals occur on the scope than can be possibly resolved. On the normal PPI screen about 200 signals can be resolved whereas in the long sweep time as many as 1,000 echoes may appear in the indicator range trace.

Received information appearing on the PPI scope contains both target echoes and noise voltages mixed together. The target echoes are unresolvable and undetectable from the noise voltages that appear in close proximity to the signal voltages. Such a condition creates a need for better resolution of the target echoes from the accompanying noise voltages. Various attempts have been made to increase the signal to noise ratio and hence improve the resolution of the target echoes on a PPI scope. Among the methods attempted is pulse stretching. If linear pulse stretching is used, the signals although increased in time duration will also be accompanied by noise voltages that have been increased proportionately.

With this invention, electrical pulses are stretched in a nonlinear manner in proportion to their magnitude, time duration or statistical distribution. An electrical delay line forms part of the circuit for such pulse stretching. In the pulse stretching circuit hereinafter described electrical pulses are repeated or stretched in varying amounts depending upon the amplitude, time duration and statistical distribution. The strongest of the signals appearing on the delay line during its presence will be stretched the maximum amount. Signals that are dominant for a time less than the period that they appear in the delay line will be stretched by an amount less than the full amount of stretching possible. Target echoes, usually of greater magnitude than noise voltages will be stretched a greater amount than these noise voltages.

An object of this invention is to provide a means for stretching a pulse echo.

Another object is to provide apparatus to increase the width of a target echo on a PPI scope.

A further object of this invention is to provide a means to increase the signal to noise ratio in a pulse echo system.

A still further object of this invention is to provide a means for non-linearly increasing the pulse width of a signal.

Another object of this invention is to recover part of the loss due to the superposition of noise and signal on a PPI when the ratio of the cathode ray sweep time to the pulse length is too great for resolution of the pulse.

Another object of this invention is to provide a delay line to increase the width of an electrical voltage pulse.

Another object of this invention is to provide a means for increasing the width of a recurrent signal.

Another object is to provide apparatus for increasing the width of recurrent signals and reducing the amplitude of noise voltages in a radio echo system.

Other objects and many of the attendant advantages of this invention will be readily appreciated as the same becomes better understood by reference to the following detailed description when considered in connection with the accompanying drawings wherein:

FIG. 1 illustrates a typical use for the pulse stretcher in a radar system.

FIG. 2 illustrates an embodiment of a delay line according to this invention in which crystal diode rectifiers are used.

FIG. 3 illustrates another embodiment in which a delay line connects to several vacuum tubes.

Referring to FIG. 1 of the drawings, a pulse stretcher 5 according to this invention is inserted between the receiver 6 and indicator 7 of a conventional radar system. These received signals as selected by the pulse stretcher are lengthened to render them more readily discernible on indicator 7.

Referring now to FIG. 2 of the drawings in which a schematic diagram of a particular embodiment of a pulse stretcher according to this invention is illustrated, a signal input 11 is provided for receiving both signal and noise voltages from a radar receiver. Delay line 13 connects to input 11 for application of the received signals to the delay line. Taps spaced equally along the delay line provide for connections to one side or terminal of unilateral impedance means such as crystal diodes 15, 17, 19, 21 and 23. A common conductor provides a connection from the other sides or terminals of the crystal diodes to resistor 26, to ground, and to grid 27 of triode 29. Plate 31 of triode 29 connects to a B+ potential source through plate load resistor 33. Cathode 35 connects through cathode resistor 37 to ground. The conduction path of tube 29 is from ground through cathode resistor 37 and then through plate load resistor 33 to B+. The conduction paths from the input 11 to ground is through varying lengths of the delay line 13, through one of the crystal diodes to conductor 25 and through load resistor 26 to ground. The signal may follow the conduction path from input 11 through crystal diode 15 to conductor 25 and thence through resistor 26 to ground. Other possibilities are paths from the input through part of the delay line 13 and through one of diodes 17, 19 and 21, or through all of the delay line 13 and through crystal diode 23 to ground. The taps on the delay line for the crystal diode connections are equally spaced at a distance such that the amount of delay between successive taps will be approximately equal to the width of a signal.

In operation a voltage pulse appearing at the input 11 and conducted through crystal diode 15, conductor 25 through resistor 26 to ground will appear across load resistor 26 causing an increase in the potential at grid 27 of tube 24. As the increase in the grid potential brings tube 29 into a state of conduction, the resultant current flow through tube 29 creates a voltage drop across cathode resistor 37.

As the voltage pulse travels to the end of the delay line, conduction through crystal diodes 17, 19, 21 and 23 occur consecutively. For example, when the pulse reaches the tap connecting crystal diode 17, conduction occurs through conductor 25, through resistor 26 to ground. Such conduction will again cause an increase in potential at grid 27 to bring tube 29 into conduction providing grid 27 is not already at a conducting potential for tube 29. If such is the case, the partially delayed pulse conducted through crystal diode 17 will renew conduction in tube 29 which in turn by virtue of the tube current flow, creates a voltage across the output resistor 37. For a particular target echo pulse, should the leading edge of the partially delayed portion conducted through crystal diode 17 arrive at a time just prior to the end of the duration of the undelayed portion of the echo pulse conducted through crystal diode 15, continuous conduction of tube 29 and thus a continuous voltage drop appears across the output resistor 37 for two echo pulse widths results. Thus the echo has been doubled in time duration. If the partially delayed pulse conducted through crystal diode 19 arrives at grid 27 of tube 29 immediately before the end of the duration of the pulse conducted through crystal diode 17, the increase in the pulse width across output resistor will be three times the original pulse width. If this process continues for the entire length of the delay line, the pulse will be stretched five times for the particular delay line illustrated with 4 delay portions. The delay line is designed with the taps spaced such that the delay time of each section is slightly less than the pulse width of the target echo. The result is that the target echoes in general are stretched to $N+1$ times the original pulse width, where N is the number of sections in the delay line. If a signal of greater magnitude should appear at the input of the delay line before the time a target echo has completely traveled through the delay line, the target echo will be stretched less than the full amount. However the statistical probabilities are large that the target echo will have the greatest magnitude of any signal appearing on the delay line at the time that the target echo is present.

If a noise voltage appears at the input 11 when no other signals are present in the delay line, the noise signal will be conducted through crystal diode 15 to grid 27 of tube 29 and initiate a current flow through said tube. An output voltage will appear across output resistor 37 as long as the noise voltage pulse persists at the input 11. Since the width of the noise voltage pulse is usually narrower than a target echo pulse, the resulting output at resistor 27 will be a series of pulses rather than a continuous pulse providing that such noise pulse is dominant during its presence in the delay line. It is highly probable that a pulse of greater magnitude will appear on the delay line before the noise voltage pulse has traveled very far and the pulse at the output resistor will be that of the dominating pulse. In either case the noise voltage pulse would not be stretched.

Referring now to FIG. 3 of the drawings in which another embodiment of the invention is illustrated, an input terminal 50 is provided for applying received signals to delay line 51. Delay line 51 has taps equally spaced along the delay line in which capacitors 53 are connected to ground. Connections from the taps on the delay line to peak selectors are made through conductors 55, 57, 59, 61 and 63 to the grids of peak selector tubes 65, 67, 69, 71 and 73 respectively. Resistor 75 provides a return path for the signals reaching the end of the delay line. Tubes 65, 67, 69, 71 and 73 have a common cathode resistor 77. Resistor 77 is connected to the output 79 from which the stretched output pulse is taken. The path of conduction of a signal appearing at the input 50 is through the delay line 51 and then through resistor 77 to ground.

In operation, when a voltage pulse appears at the input 50, the potential increase is conducted to the grid of tube 65. The increase in grid potential causes the current to flow through tube 65 and as a result of such current flow a voltage is developed across the common cathode resistor 77. The current flow through tube 65 will continue to conduct and a voltage will appear at output 79 as long as the voltage pulse appears at the input 50. As the voltage pulse travels along the delay line a subsequent tube will conduct when the pulse reaches its respective tap along the delay line.

Tube 67, 69, 71, 73 will conduct successively as the voltage pulse travels along the delay line. The conduction of any of the tubes 65–73 will cause a voltage to appear across resistor 77.

Inasmuch as the cathode of all the tubes are tied together, initiation of conduction in any one tube causes a voltage drop across cathode resistor 77 and raises the cathode potential of all tubes. Thus, when more than one pulse is in the delay line, the cathode current of the tube having the strongest signal in its grid produces a cathode bias level for all tubes which tends to render them unreceptive to the smaller amplitude pulse.

When both random noise voltages and target signals appear along the delay line simultaneously, the signal having the greatest magnitude during its presence in the delay line will determine the voltage across resistor 77 and hence the output voltage to be applied to the indicator scope. Target signals having generally a greater magnitude than noise voltages will be favored over the lesser amplititude random noise voltages. A target signal having a width equal in time to the delay of one portion of delay line, for example, the delay between taps of conductors 57 and 59 will cause continuous conduction through resistor 77 and an output pulse width N times the input pulse width will result when N is the number of sections or portions of delay line used.

The number of delay portions or sections in the delay lines is illustrated as four. Any number of delay portions or sections of delay line may be used to achieve a greater or lesser amount of pulse stretching. The pulse will be stretched 5 times its original width in the delay lines shown in FIGS. 2 and 3 in which four portions or sections of delay line are used, each section having a delay equal to the pulse duration. Any type of electromagnetic delay line that will accomplish the necessary delay may be used. In FIG. 3, capacitors 53 are shown. These may be conventional capacitors or the inherent distributed capacitance of the delay line.

Although the embodiments disclosed in the preceding specifications are preferred, other modifications will be apparent to those skilled in the art which do not depart from the scope of the broadest aspects of the present invention.

What is claimed is:

1. In a radar system, a pulse stretcher for lengthening echo pulses and reducing noise voltages comprising an electromagnetic delay line having an input, an output and a plurality of taps therebetween, a plurality of crystal diode rectifiers, one of said diodes having one terminal connected to said input, another diode having one terminal connected to said output, each of the remaining diodes having one terminal connected to a different one of said plurality of taps, a common conductor connected to all the other terminals of said plurality of diodes, a load resistor connected to said common conductor, said tap spacing being such that the strongest signal delay line will appear across said resistor during the entire period that any portion of said signal remains in said delay line.

2. In an electrical circuit, a source of signals providing a series of pulses having a selected period, each of said pulses having a selected duration, a delay line having a plurality of sections connected in cascade and an input terminal and an output terminal at opposite ends of said cascade connection, each of said sections having a time delay substantially equal to the selected duration of each of said pulses, means for applying a pulse from said source to the input terminal of said delay line, means connected to said plurality of sections for deriving a plurality of consecutive signals, each of the plurality of signals having a duration substantially equal to said selected duration, and means connected to said last mentioned means and responsive to said plurality of signals for providing a signal having a duration substantially equal to the sum of the durations of each of said plurality of signals.

3. In an electrical circuit, a source of signals providing a series of pulses having a selected period, each pulse having substantially the same selected duration, a delay line having a plurality of sections connected in cascade, each having a time delay substantially equal to the duration of each pulse, a plurality of electron tubes connected in parallel, each electron tube having at least an anode, a cathode, and a control element, means for applying a pulse from said source of signals to only the first of said plurality of sections and to the control element of only the first of said plurality of electron tubes, means connecting the control element of each remaining one of said plurality of electron tubes to a respective one of said plurality of sections for applying a signal to the control element having a duration substantially equal to said time delay, an impedance element, means for connecting said impedance element between the cathode of each of said plurality of electron tubes and ground, an output circuit, and means for connecting said output circuit across said impedance element.

References Cited in the file of this patent

UNITED STATES PATENTS

| | | |
|---|---|---|
| 2,410,233 | Percival | Oct. 29, 1946 |
| 2,677,128 | Spaulding | Apr. 27, 1954 |
| 2,764,678 | Craib | Sept. 25, 1956 |
| 2,822,538 | Trevor | Feb. 4, 1958 |